(No Model.)

E. P. USHER.
STORAGE BATTERY.

No. 480,885. Patented Aug. 16, 1892.

WITNESSES.
Frank G. Parker
Matthew M. Blunt.

INVENTOR.
Edward P. Usher
by A. N. Jenney
Attorney

UNITED STATES PATENT OFFICE.

EDWARD P. USHER, OF GRAFTON, MASSACHUSETTS, ASSIGNOR TO THE HOPEDALE ELECTRIC COMPANY, OF WEST VIRGINIA.

STORAGE-BATTERY.

SPECIFICATION forming part of Letters Patent No. 480,885, dated August 16, 1892.

Application filed February 19, 1892. Serial No. 422,094. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

My invention relates to the construction of the cell of a secondary battery, and its main features may be applied to a cell made up of any of the conventional types of plates, the object being to insure against danger of short-circuiting and to firmly unite the plates and their separators at bottom.

The especial feature of novelty in my method and apparatus is the sealing of the several plates and interposed separators at and near their lower edges, so as to hold the parts in the proper relation and prevent the contact with the negative plate of any of the active material which may crumble from the positive plate. This sealing is effected by erecting the plates and separators in a shallow body of gum or the like while in a hot and liquid state and allowing it to cool and harden around and among the parts or by applying plastic strips, which harden and adhere to the edges of the plates and separators near the bottom. I prefer to combine both these means of sealing the parts.

I employ separator-plates of kiln-dried wood and apply them directly to the face of the positive plates, while I maintain an open space between the separators and the several negative plates, so as to insure a free circulation.

Figure 1:
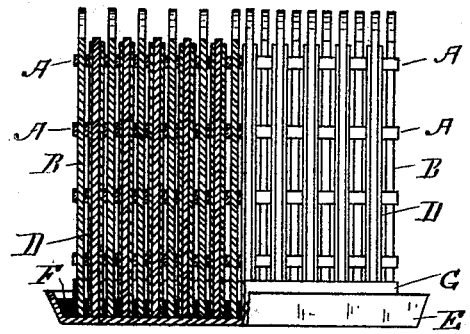
Figure 2:
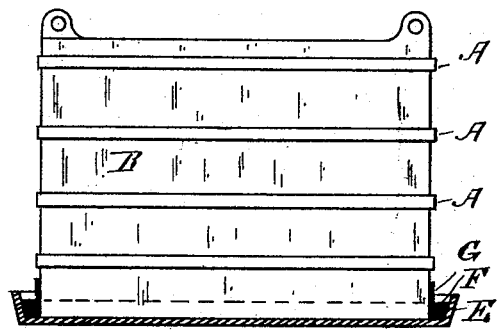

In the drawings, Figure 1 is an edge view, partly in vertical section, through a battery-cell sealed according to my invention. Fig. 2 is a like view in a plane at a right angle to that of Fig. 1.

In carrying out my invention I place two or more rubber bands A around each of the negative plates B. In practice I have found four bands preferable. Close to the positive plates C and on each side of it I place a thin kiln-dried wooden separator-plate. Upon assembling the plates the rubber bands which encircle the negative plate press against the adjacent separator-plate, leaving, however, between the wooden plate and the negative a clear open space corresponding in size to the thickness of the rubber band employed. Any other article equivalent in effect to the rubber band could of course be used. In lieu of this construction I sometimes surround the positive plate and the two separator-plates in contact with it with the rubber bands or other binders, thus giving between said separators and the negative plate the open space desired for free circulation. I then prepare a substance made of beeswax, pitch, sulphur, tallow, and rosin, or their equivalents, which compound when heated flows as an oil or liquid gum and when cold is hard and tough and slightly flexible. I do not limit myself to this specific compound, and I make no present claim thereto, the same forming the subject-matter of my application for patent filed June 10, 1892, Serial No. 436,211. Into a shallow mold or pan E, filled with this oil while hot, I place the assembled plates and allow the oil to cool and harden. This filling of the pan I regulate so that the substance F shall rise about one-half inch from the bottom of each plate. A sheet or strip G of this same substance or of a suitable material coated therewith is prepared and applied when warm and somewhat plastic to the edges of the separators and plates forming the cell at the bottom, so as to cover such edges to the height of one inch or more.

It will be seen that flotation of the separators is entirely overcome by the bottom sealing described or by the edge strips applied to the several plates and separators, and hence that short-circuiting cannot arise from any crumbling of the active material, and the cell will be far firmer than has been possible heretofore. It will also be apparent that the lower edges only of the plates and separators are embedded in the gummy compound and that such compound being placed within the mold or pan E will not adhere to the inclosing jar, and hence will not involve destroying the jar when the plates are removed.

I am aware that wooden separator-plates have been proposed; but I believe that no commercial use has ever been made of cells fitted with them and that no distinction has been recognized in the essential condition of the work.

I have discovered that if green wood be used the internal resistance of the cell is increased in a very marked degree, while the kiln-dried wood does not seem to injuriously affect the use of the cell to any appreciable extent. Furthermore, if the wooden separator be placed in close contact with both negative and positive plates the liquid cannot circulate freely and the efficiency of the cell is impaired. As the negative plate undergoes no deterioration, the open space left, as I have described above, does not endanger an accumulation of the active material at the bottom of the cell, while it gives the free circulation so essential to successful use.

The sealing of the bottom and sides of the cell, as described, prevents short-circuiting by reason of any deposit that might be made from the positive plates, while the use of the separators tends to reduce this deposit to a minimum. The separator-plates also prevent all short-circuiting arising from buckling or analogous difficulties.

I claim as my invention—

1. In combination with the plates of a secondary cell, two wooden separator-plates applied closely on each side of each positive plate, two or more rubber bands or their equivalent interposed between each negative plate and the adjacent separator, leaving an open space on each side of said negative plate, substantially as described.

2. A battery-cell composed of alternate positive and negative plates with interposed separator-plates, in combination with a sealing substance or compound in which the lower edges only of said plates are embedded, such substance or compound not adhering to the jar, substantially as set forth.

3. A battery-cell composed of alternate positive and negative plates and interposed separator-plates, in combination with sealing-strips applied to the vertical edges of the several plates along the lower portion thereof, substantially as set forth.

4. The described method of sealing and uniting the several plates and interposed separators of a battery, consisting in erecting such plates and separators in a shallow mass of hot viscous gum and allowing said gum to cool and harden around the base of the plates and separators, and finally applying a strip of similar material to the lower vertical edges of said parts, substantially as set forth.

In testimony whereof I have signed my name to this specification, in the presence of two subscribing witnesses, on this 17th day of February, A. D. 1892.

EDWARD P. USHER.

Witnesses:
  A. H. SPENCER,
  GEORGE S. LITTLEFIELD.